Patented Oct. 6, 1925.

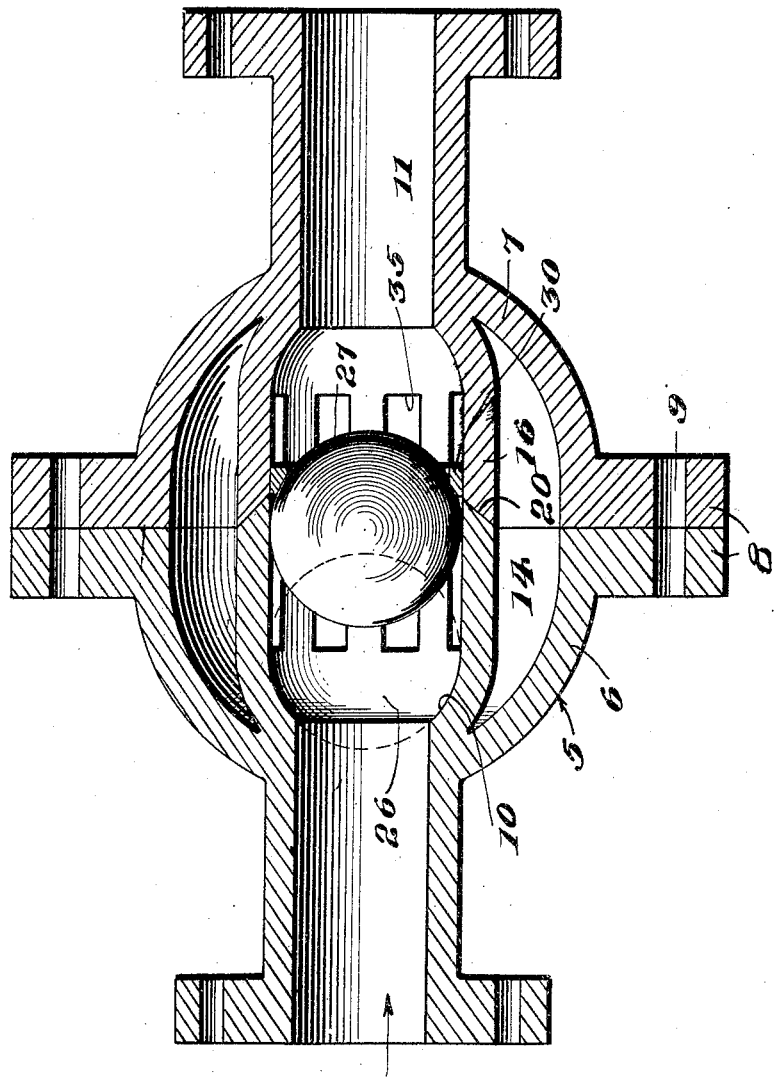

1,555,934

UNITED STATES PATENT OFFICE.

CAULEY M. BARKER, OF CROSS CITY, FLORIDA.

ONE-WAY VALVE.

Application filed March 26, 1925. Serial No. 18,583.

*To all whom it may concern:*

Be it known that I, CAULEY M. BARKER, a citizen of the United States, residing at Cross City, in the county of Dixie and State of Florida, have invented new and useful Improvements in One-Way Valves, of which the following is a specification.

This invention relates to one way valves especially adapted for use in connection with acids, steam, air, or the like, and has for important objects the provision of novel means whereby the flow is positively limited to one direction.

A further object is to provide a valve of the character specified which is of highly simplified construction, durable in use, and which may be readily taken apart for cleaning or for the purpose of renewing the ball or any other part of the valve which may be rendered unfit for further use.

A further object of the invention is to provide a valve capable of withstanding the errosive and destructive effect of sulphuric and other acids and which will provide a positive shut-off without the aid of packings which must be frequently renewed.

Other objects and advantages will be apparent during the course of the following description:—

In the accompanying drawing forming a part of this application and in which like numerals are employed to designate like parts throughout the same, The figure is a sectional view through a valve constructed in accordance with this invention.

In the drawing, wherein for the purpose of illustration is shown a preferred embodiment of my invention, the numeral 5 designates an approximately bulbous body consisting of two more or less semibulbous sections 6 and 7, the meeting portions of which are provided with flanges 8 having aligned openings 9 for the reception of screw bolts or the like by means of which the sections 6 and 7 may be conveniently connected.

The drawing illustrates that the sections 6 and 7 are provided with inlet and outlet tubular portions 10 and 11, respectively, having aligned slotted cage like members 14 and 16 positioned within the sections 6 and 7. The slotted cages 14 and 16 have their inner ends beveled in opposite directions and in contact with each other as indicated at 20.

The cage 14 is provided at the rear end thereof with an annular seat 26 with which the ball valve 27 is adapted to co-act to establish a fluid tight joint. That is to say, when the ball valve 27 is engaged with the annular seat 26, the return of any fluid through the valve is positively cut off. Particular attention is directed to the fact that the rear portion of the cage 14 is reduced in internal diameter to provide a rounded seat of a very generous area for engagement by the ball 27. When the ball 27 is engaged with the rounded seat 26 it is positively held against lateral movement by fluid pressure.

The fluid, most likely acid, enters by way of the tubular portion 10 from a supply tank and unseats the ball 27 whereupon the ball moves to the full line position illustrated in the drawings and engages an annular shoulder 30 whereby the ball is held approximately at the meeting point of the cages 14 and 16. The shoulder 30 may be welded or threaded in the cage 16 or if found practical may be formed integral with the cage 16. The acid or the fluid may now flow through the slot in the cage 14 and into and through the semi-bulbous sections 6 and 7. The acid or other fluid which enters the semi-bulbous sections 6 and 7 may make its exit through the slot 35 in the section 16 and by way of the outlet member 11. Back pressure will result in the return of the valve 27 to its seat 26, so as to bring about a one way movement of the fluid.

Having thus described the invention what is claimed is:—

1. A one way valve comprising a pair of semi-bulbous sections having internal slotted cages of tubular formation arranged in end to end relation and having their inner ends beveled in opposite directions and in contact with each other whereby the cages are held in alignment, one of said cages being reduced internally at one end to form an annular seat, and a ball valve positioned within said cages and adapted for engaging said seat.

2. A one way valve comprising a pair of semi-bulbous sections having internal slotted cages arranged in end to end relation and having their inner ends beveled in opposite directions and in contact with each other, one of said faces being provided with an annular seat, and a ball valve positioned within said cages and adapted for engaging said seat, the other cage being provided with an annular shoulder adapted for engagement by said ball valve whereby to limit the movement of the ball valve.

3. A one way valve comprising a pair of semi-bulbous sections having internal cages arranged in end to end relation and having their inner ends beveled in opposite directions and in contact with each other, one of said cages being provided with an annular seat, and a ball valve positioned within said cages and adapted for engaging said seat, the other cage being provided with an annular shoulder adapted for engagement by said ball valve whereby to limit the movement of the ball valve, said cages being provided at opposite sides of said shoulder with slots establishing communication between the interior of the cages and the interior of the semi-bulbous sections whereby fluid may flow around the ball valve when the ball valve is unseated.

In testimony whereof I affix my signature.

CAULEY M. BARKER.